United States Patent
Dong

(10) Patent No.: US 8,948,101 B2
(45) Date of Patent: Feb. 3, 2015

(54) CLIENT-SERVER COMMUNICATIONS IN MOBILE RADIO COMMUNICATIONS DEVICE

(75) Inventor: Olivier Dong, Berkshire (GB)

(73) Assignee: NEC Corporation, Tokyo (JP)

( * ) Notice: Subject to any disclaimer, the term of this patent is extended or adjusted under 35 U.S.C. 154(b) by 828 days.

(21) Appl. No.: 13/129,747

(22) PCT Filed: Jul. 31, 2009

(86) PCT No.: PCT/JP2009/063975
§ 371 (c)(1),
(2), (4) Date: May 17, 2011

(87) PCT Pub. No.: WO2010/058634
PCT Pub. Date: May 27, 2010

(65) Prior Publication Data
US 2011/0228738 A1    Sep. 22, 2011

(30) Foreign Application Priority Data

Nov. 20, 2008    (GB) .................................. 0821236.7

(51) Int. Cl.
*H04W 4/00*    (2009.01)
*H04L 12/70*   (2013.01)
*H04L 29/08*   (2006.01)
*H04L 29/06*   (2006.01)

(52) U.S. Cl.
CPC .............. *H04L 67/02* (2013.01); *H04L 69/162* (2013.01); *H04L 69/16* (2013.01)
USPC ............................ 370/329; 370/389; 709/203

(58) Field of Classification Search
None
See application file for complete search history.

(56) References Cited

U.S. PATENT DOCUMENTS

| 6,584,096 | B1 * | 6/2003 | Allan ............................. 370/352 |
| 7,283,517 | B2 * | 10/2007 | Yan et al. ...................... 370/352 |
| 8,190,146 | B2 | 5/2012 | Beckmann et al. |
| 2003/0106067 | A1 * | 6/2003 | Hoskins et al. ............... 725/119 |
| 2003/0165121 | A1 * | 9/2003 | Leung et al. .................. 370/313 |
| 2005/0125539 | A1 * | 6/2005 | Tripathi ........................ 709/227 |
| 2007/0220498 | A1 * | 9/2007 | Madsen ........................ 717/140 |
| 2008/0056263 | A1 | 3/2008 | Jain et al. |

(Continued)

FOREIGN PATENT DOCUMENTS

| CN | 1672364 A | 9/2005 |
| EP | 1954086 A1 * | 8/2008 |
| EP | 1973306 A1 | 9/2008 |

(Continued)

OTHER PUBLICATIONS

ETSI TS 102 223 V8.2.0 Technical Specification, Smart Cards; Card Application Toolkit (CAT) (Release 8), 2009, 203 pages.

(Continued)

*Primary Examiner* — Robert C Scheibel
(74) *Attorney, Agent, or Firm* — Foley & Lardner LLP

(57) ABSTRACT

The invention provides for a method of communication within a mobile radio communications device between a chip-card in server mode and any one or more of a plurality of clients each having the same IP address, the method including the steps of creating for each of the clients a socket, wherein each socket is bound to a client port allocated by the device, associating a client identifier to each of the bound client ports, and making each said client identifier available to the chip-card whereby the chip card can distinguish between messages from the plurality of clients.

16 Claims, 4 Drawing Sheets

(56) References Cited

U.S. PATENT DOCUMENTS

| | | |
|---|---|---|
| 2010/0035651 A1 | 2/2010 | Dong |
| 2010/0220721 A1* | 9/2010 | Standridge et al. ........... 370/389 |

FOREIGN PATENT DOCUMENTS

| | | |
|---|---|---|
| JP | 2000-59385 A | 2/2000 |
| JP | 2002-185517 A | 6/2002 |
| JP | 2004-192358 A | 7/2004 |
| WO | WO 2004/068819 A1 | 8/2004 |
| WO | WO 2005/125154 A1 | 12/2005 |
| WO | WO 2007/058241 A1 | 5/2007 |
| WO | WO 2007/105051 A2 | 9/2007 |
| WO | WO 2008/044597 A1 | 4/2008 |

OTHER PUBLICATIONS

Jiang, J., et al. "Design and Implementation of a Cross-platform Protocol-independent Network Class Library". *China Education Network*, No. 2, Feb. 28, 2007, pp. 7/10-10/10.

Office action mailed Feb. 21, 2014 in related Chinese Application No. 200980146605.9 with English-language translation (13 pgs.).

* cited by examiner

CLIENT-SERVER COMMUNICATIONS IN MOBILE RADIO COMMUNICATIONS DEVICE

TECHNICAL FIELD

The present invention relates to a method of communication within a mobile radio communications device, and to a related mobile radio communications device and signaling arising therein.

BACKGROUND ART

Mobile radio communication devices such as cell phone handsets have long employed chip-cards such as a Subscriber Identity Module (SIM) and, with regard to so-called 3G handsets, a Universal Integrated Circuit Card (UICC). Such cards are generally arranged to contain with caller and network related information and include memory and microcontroller functionality.

Such known chip-cards as are employed within mobile radio communication devices are becoming increasingly sophisticated and further functionality has included the provision of a server within the chip-card such that, for example, the UICC can operate in a server mode to one or more clients whether locally on the mobile radio communications device Mobile Equipment (ME), or remote therefrom.

While such chip-cards can readily be provided with such server functionality for communication with a client, scenarios also arise in which it is required that the server communicate with one or more of a plurality of clients each having the same IP address, such as for a plurality of local clients provided on the same ME as the chip-card server.

Communication between the chip-card server and the ME is generally supported by the Bearer Independent Protocol (BIP). However, the information payload delivered by way of the BIP channel does not include information serving to indicate the client from which the signaling originates and so there is no inherent way in which the server chip-card can distinguish between payloads originating from different clients each sharing the same IP address.

It is known to support Transmission Control Protocol (TCP) over a BIP channel, for example for a UICC in server mode, and wherein a plurality of clients sharing the same IP address are present. Here a single specific BIP channel is provided for each particular TCP connection. However, disadvantages arise insofar as the provision of a plurality of separate BIP channels is relatively resource-consuming for both the ME and, for example, the chip-card and additional provisions needs to be made so as to keep the data from different clients separate and which generally requires the provision of several buffers.

Additionally, overheads associated with the support of TCP over the BIP channel can prove disadvantageously limiting having regard to the relatively safe and secure environment in which the server chip-card ME interface operates.

The present invention seeks to provide for a method of communication in a mobile radio communications device between a chip-card in server mode and any one of a plurality of clients each having the same IP address, and which has advantages over known such methods. Likewise the invention seeks to provide for a related mobile radio communications device, and signal arising therein, and which exhibit advantages over such known devices and related signaling.

DISCLOSURE OF THE INVENTION

According to an exemplary aspect of the present invention there is provided a method of communication within a mobile radio communications device between a chip-card in server mode and any one or more of a plurality of clients each having the same IP address, the method including the steps of creating for each of the clients a socket, wherein each socket is bound to a client port allocated by the device, associating a client identifier to each of the bound client ports, and making each said client identifier available to the chip-card whereby the chip card can distinguish between messages from the plurality of clients.

Advantageously therefore it will be appreciated that the invention allows for a chip-card, such as a UICC, to distinguish between several clients on the basis of the socket-port pairing controlled within the mobile radio communications device.

Also, the method can be provided for communication between a chip-card comprising a UICC in server mode and several clients.

Further, the method can provide for communication between a chip-card and a plurality of clients provided within the mobile radio communications device, It should of course be appreciated that the method of communication can be arranged to be supported by a BIP channel in the mobile radio communications device.

Advantageously within the method of the present invention, the client port to be bound to a particular client socket can be assigned by way of the mobile radio communications device.

Alternatively, the client port to be bound to a particular client socket can be derived from a predetermined selection of ports.

Further, the method can be arranged such the mobile radio communications device stores the client port and paired client identifier information.

Advantageously, the method can include the step of making the client identifier available to the mobile radio communications device-chip-card interface.

Preferably, the method can include the support of Universal Datagram Protocol (UDP) communication between the server and client(s).

In this manner, the support of a chip-card in UDP server mode can be provided within APDU command signaling.

Further, the support of chip-card UDP server mode can be provided within the open channel proactive command signaling.

As an alternative, the method can include the support of TCP communication and the creation of a TCP socket as required.

In this manner, the method can further include the step of monitoring for incoming connection requests on the server port.

The method can also include the creation of a further TCP server socket and responsive to the incoming connection request so as to leave the original server socket for further incoming connection requests.

According to another exemplary aspect of the present invention there is provided a mobile radio communications device having a chip-card and arranged for operation according to a method of communication as defined above. Such a mobile radio communications device as noted above can be arranged for execution of software instructions for control of the method.

According to a yet further exemplary aspect of the present invention, there is provided a signaling message to a chip-card in server mode within a mobile radio communications device, the message originating from one of a plurality of clients each having the same IP address and the message including a client identifier associated with a bound socket and client port, such that the chip-card can distinguish between messages from the plurality of clients.

Preferably, the signaling comprises a terminal response message.

According to still a further exemplary aspect of the present invention there is provided a signaling message from a chip-card in server mode in a mobile radio communications device, and to be delivered to at least one of a plurality of clients each having the same IP address, the signaling message including a client identifier associated with a bound socket and client port, such that the chip-card can distinguish between the plurality of clients for delivery of the signaling message.

Advantageously, the signaling includes a send data command signal.

As will be appreciated, through functionality within the mobile radio communications device, each of the plurality of clients can be allocated a port number for example by way of the socket layer within the mobile radio communications device, or by way of predetermined port numbers allocated to specific types of applications.

Further, the present application therefore advantageously provides an arrangement for allowing the chip-card to distinguish between several clients on the basis of functionality within the mobile radio communications device and which advantageously takes into account the constraints arising in relation to the existing card interface so as to assist with backward compatibility of the present invention.
The invention in particular is based on a combination of procedural steps such as the identification of port numbers, association with a simple identifier which can reduce the required bits/bytes on the mobile radio communications device-chip-card interface, and the extension of the range of an existing parameter on the interface, so as to provide the required ability for the chip-card, rather than merely the mobile radio communications device, to distinguish between several clients each having the same IP address.

Thus while, for example, the UICC server mode over a BMP channel as currently defined in the document ETSI TS 102 223 only supports TCP mode communication, the present invention not only provides for a particularly advantageous mechanism for the support of such communication, but also supports UDP mode operation such that any applications within, for example, the mobile radio communications device and based on UDP can then interact with the chip-card which is likewise arranged to function within UDP server mode.

The advantages of speed and efficiency that arise for the use of UDP mode therefore can be readily employed within the context of the mobile radio communications device and chip-card server interface and so in scenarios in which the additional security and reliability of TCP mode might in any case not be required.

The invention is described further hereinafter, by way of example only, with reference to the accompanying drawings.

BEST MODE FOR CARRYING OUT THE INVENTION

With reference to the article ETSI TS 102 223 Rel-8 Specs, it is known to support TCP over a BIP channel for a UICC in server mode and such that only a TCP client application within the mobile radio communications device Mobile Equipment (ME) and a TCP server within the UICC can communication over the BIP channel.

However, the manner in which a plurality of clients each having the same IP address and the UICC in server mode can communicate is disadvantageously limited, and the mere support of only TCP mode can likewise prove inappropriate and limiting.

As will be appreciated from the foregoing, the present invention provides for not only a mechanism by which, for example, a UICC in server mode can reliably communicate with one or more of a plurality of clients each having the same IP address, but also one that allows for the support of UDP over the BIP channel, such that each client can comprise a UDP client, and the UICC in server mode can comprise as a UICC UDP server.

Figure 1:
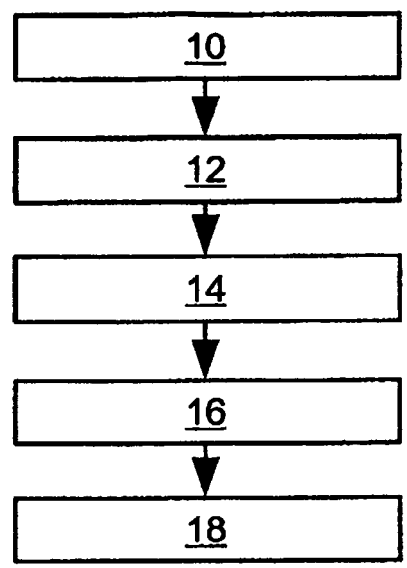
FIG. 1 is a schematic block diagram of a protocol stack and processing flow for a scenario in which UDP is supported both within the mobile radio communications device and the chip-card.

While the signaling arising in accordance with two particular exemplary embodiments of the present invention is described further below, reference is first made to FIG. 1 which illustrates a protocol stack and processing flow for a scenario in which UDP/IP are supported on both the ME and the UICC sides of the interface although it should be appreciated that FIG. 1 illustrates only the processing on the client side. That is, there is illustrated a client (application) 10 and the subsequent provision of a UDP stack 12 which provides a header which can include the source, and destination, port numbers and the subsequent provision of IP support 14 prior to BIP, or Ethernet emulation 16 and subsequent delivery to the physical layer 18 which can comprise a Universal Serial Bus (USB) connection or otherwise.

Figure 2:
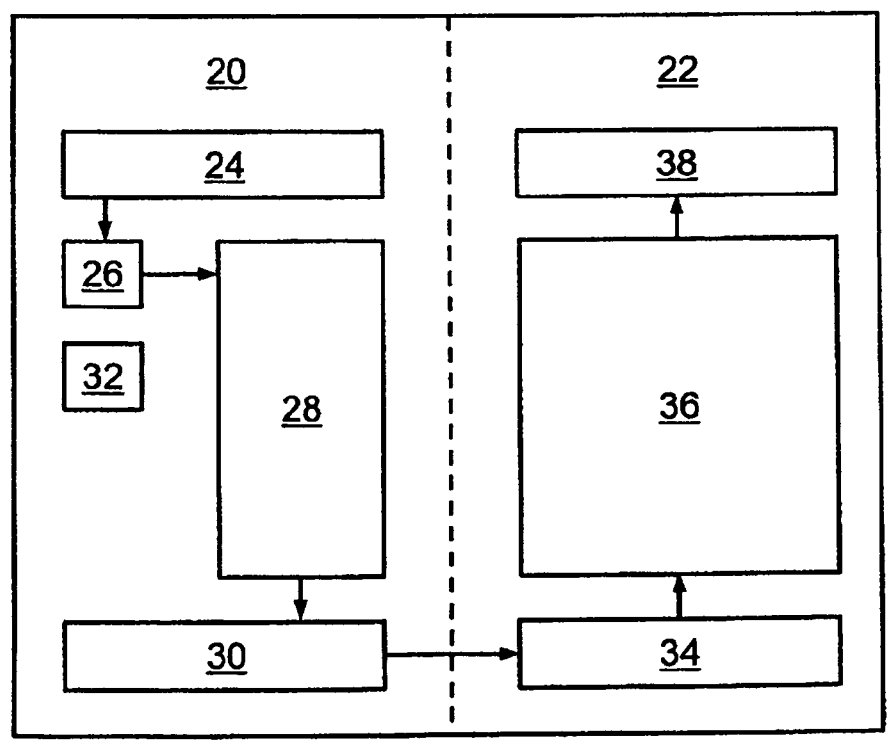
FIG. 2 is a similar stack and processing flow diagram to that of FIG. 1 but for scenario in which only BIP is supported on the chip-card side of the interface.

However, turning now to FIG. 2, there is provided an illustration of a scenario in which, at the UICC side only BIP is supported such that there is no provision of a UDP/IP, or indeed a TCP stack.

As illustrated, on a client side 20 of the interface there is provided the client (application) 24 and related UDP sending request 26. Since the ME can identify that, at the UICC side, only BIP is supported, the UDP layer 26 will simply forward the UDP sending request to the BIP Layer 28. Here, the BIP layer 28 extracts the client (application) 24 data from the UDP sending request, and, associates the client port with an identifier to be described later.

The data is then ready to be sent to the UICC side via the interface.

On the UICC 22 side of the interface, the physical layer comprises, for example, USB 34 and receives the data which is then delivered via BIP 36 to the server 38 within the UICC.

Figure 3:
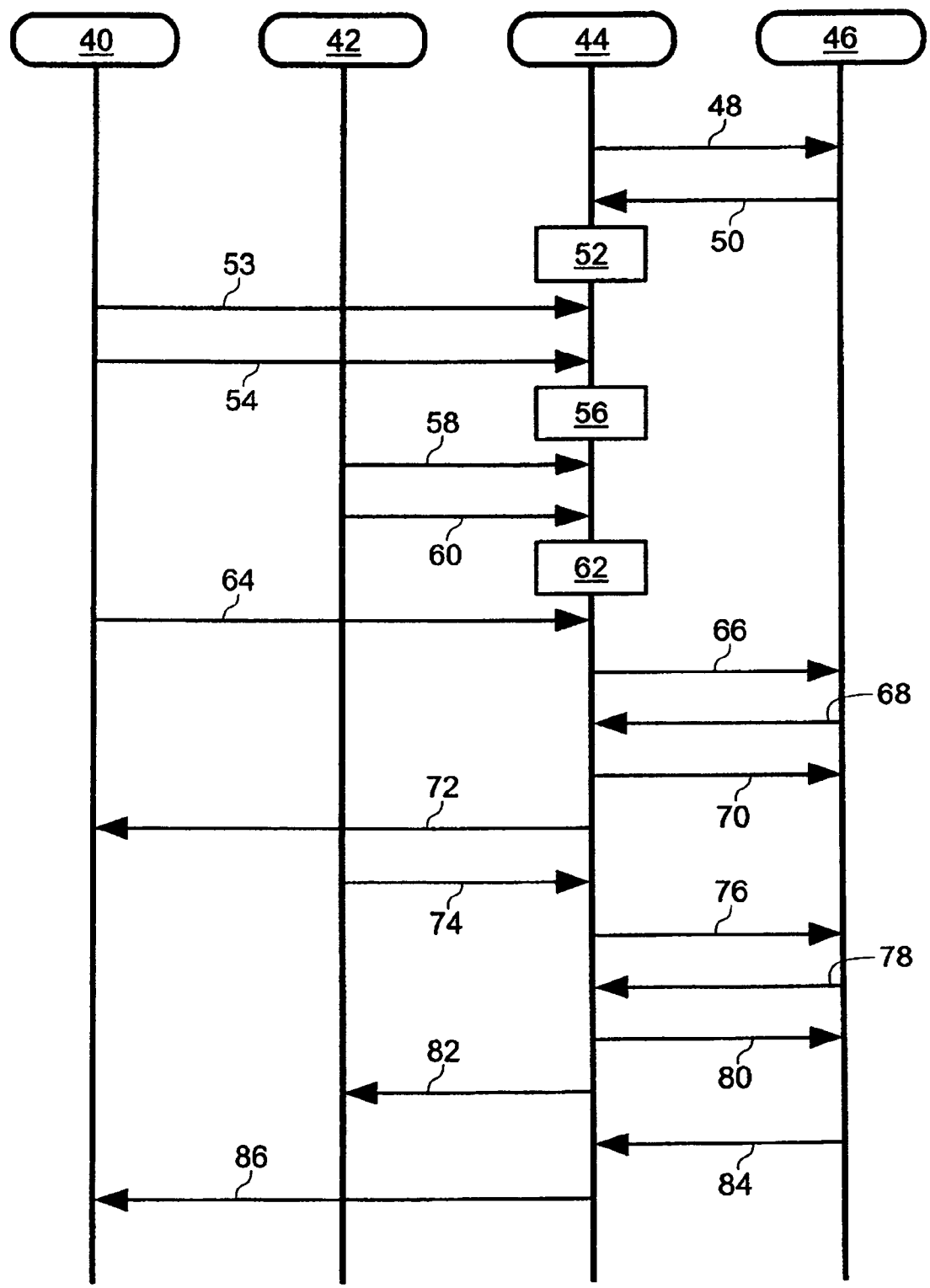
FIG. 3 is a signaling diagram between a chip-card and a plurality of clients within a mobile radio communications device and according to one embodiment of the present invention.
Figure 4:
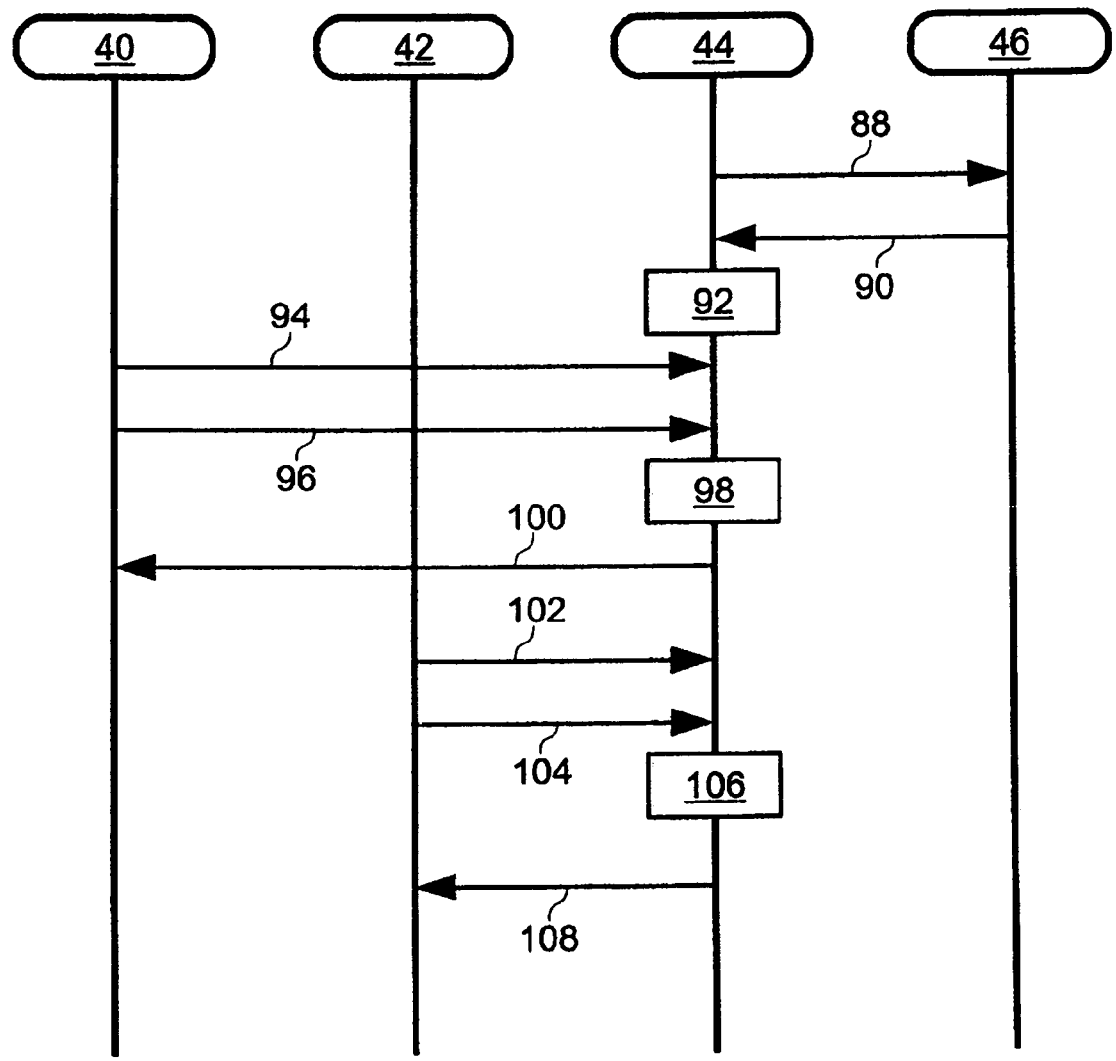
FIG. 4 is a similar but partial signaling diagram between a chip-card and a plurality of clients within a mobile radio communications device and according to another embodiment of the present invention.

As mentioned, particular examples of signaling arising in relation to two separate embodiments are discussed further in relation to FIGS. 3 and 4 of the application.

In achieving the particularly efficient identification within the UICC for data originating from one or more of a plurality of clients, the invention lends itself in particular to the support of UDP over the BIP channel.

However, it should be appreciated that the invention is in no way restricted to the support of UDP. For example the advantageous manner in which the UICC can determine the client-source of incoming data, and can deliver data in return to an appropriate target client, is not restricted to any particular communication schemes such as UDP nor TCP.

However, and merely for further illustration, with regard to the support of UDP, it should be appreciated that the invention can provide for the support of UICC UDP server mode within the terminal profile APDU command, and also add the support of UICC UDP server mode within the open channel proactive command.

As required, any one or more of the plurality of UDP client applications is arranged to create a UDP socket and, importantly, to bind that socket to a particular port number. The port number can be assigned by the ME or retrieved from a predetermined range in advance and can then be subsequently defined, or identified, as the source (or client) port number for the particular client application.

The ME can be arranged subsequently to associate an identifier, referred to hereinafter as "UDP client identifier", to each of the aforementioned client source port numbers.

Such source port numbers, and UDP client identifier pairs can remain stored within the ME as appropriate.

To allow for the desired discriminating functionality of the present invention within the UICC, the UDP client identifier can be made available to the ME-UICC interface and this, for example, can be achieved by way of the Envelope Event Download Data, the Received Data, the Send Data and/or the Terminal Response Commands.

The UICC can then discriminate between several UDP clients on the basis of this UDP client identifier.

Turning now to FIG. 3, there is provided a signaling diagram arising within an ME between first and second clients 40, 42, the main ME processor 44 and a UICC 46 in UDP server mode.

During the power-up sequence, the ME 44 sends its Terminal Profile message 48 to the UICC 46 indicating that "UICC UDP server mode" is supported by the ME 44.

Once the power-up sequence is completed, although this could be at any time after the Terminal Profile is sent, the UICC 46 sends an Open Channel proactive command 50 to the ME 44 indicating its wish to open a channel in UICC UDP server mode. In particular, this command 50 includes the relevant server port number, i.e. the port used by the UDP server 46 to communicate with a UDP client application.

The ME 44 accepts the command and in particular, memorizes the aforementioned UDP server port number. For subsequent steps in the signaling procedure, the ME 44 will monitor 52 whether or not any data is received on this particular server port.

Assuming the first UDP client 40 application in the ME 44 wants to communicate 53 with the UICC server 46 in UDP mode, this application will first create 54 a UDP socket, and then bind 54 this socket with a source port number which can be referred to at the client source port number. As noted, this port number could be fixed in advance or retrieved calling the "getsockname" primitive for example in case it has been dynamically allocated by the ME 44.

Subsequently, the ME 44 memorizes this client source port number and associates 56 a UDP client identifier (e.g. a simple number assigned by the ME) to this port number.

This could be done using a simple array in the ME to store the "client port number-UDP client identifier" pairs data.

As will be seen, similar signaling 58, 60 and identifier assignment 62 is then conducted for the second UDP client application 42.

When the first UDP client application 40 calls the UDP sending data function to send data 64 to the UICC UDP server 46 it is noted that the UDP client knows in advance the UICC UDP server port number and this port could be a standard port number allocated by IANA.

The ME 44 recognizes this request as a request to the UICC UDP server 46 thanks to the server port number indicated by the UDP client 40 in the sending function 64 and the ME 44 will then extract the payload from this function and save it in its memory.

The ME 44 then sends an "Event Download-Data Available" Envelope command 66 to the UICC UDP server 46 by indicating the allocated UDP client identifier for example within the Device identities data object included in this Envelope command 66.

By receiving the Envelope 66, the UICC 46 acknowledges that there is a UDP client, on the basis of the UDP client identifier, which it identifies as attempting to communicate with the UICC UDP server.

The UICC 46 then sends a Receive Data command 68 to the ME 44 in order to retrieve the data from the UDP client 40. In particular, the Receive Data command 68 can also contain the UDP client identifier.

By receiving this Receive Data command 68, the ME 44 can encapsulate the UDP client application data (previously saved payload), referenced by the UDP client identifier, in the "Channel Data" data object, include the UDP client identifier (e.g. in the Device Identities data object), and then send the Terminal Response 70 to the UICC 46.

It should be appreciated that server's "Receive Data-Terminal Response" exchanges/cycles could be employed in case the UDP client data cannot be sent using a single Terminal Response, i.e. with the data amount exceeding the data transport capability of a single Terminal Response.

By receiving this Terminal Response 70, the UICC 46 will be able to know from which UDP client (40 in this case) the data is originating from due to the UDP client identifier.

The ME 44 can then confirm the correct sending of the data by sending an acknowledge message 72 to the UDP client.

Similar signaling exchanges 74, 76, 78, 80, 82 will arise when the second client application 42 UDP calls the UDP sending data function to send data 74 to the UICC UDP sever 46.

In turn, the UICC sever 46 can send data 84, 86 to a particular UDP client 40, 42 and the UICC will then, on the basis of the invention, simply need to specify the UDP client identifier in the Send Data proactive command 84.

When the ME 44 receives this Send Data command 84 from the UICC 46, thanks to "UDP client identifier/client port number" pairs information, the ME44 will be able to send this data 86 to the correct client application 40.

Turning now to FIG. 4, there is illustrated signaling arising between first and second clients 40, 42, a ME main processor 44 and a UICC 46 but this time in accordance with the support of TCP over the BIP channel. That is, each of the clients 40, 42 comprise TCP clients, and the UICC 46 is considered to operate in TCP server mode.

As will be appreciated from the following discussion, only the initial stages in the signaling is illustrated in FIG. 4 since the latter exchanges simply mirror those illustrated in relation to the embodiment of FIG. 3.

Again, starting with a power-up sequence, the ME 44 sends a terminal profile signal 88 indicating the support of TCP and the UICC in server mode to the UICC 46 and, as before, subsequent to completion of the power-up sequence, the UICC 46 sends an open channel proactive command 90 to the ME 40.

At this stage, and as indicated at 92, the ME then creates a TCP socket and binds this socket with the required server port. The related "listen" and then the "accept" functions can also be initiated so that the ME can start to monitor any incoming connection request on the server port.

For the subsequent support of communication from the first client 40, the signaling 94, 96 is delivered from this client 40 to the ME 44 in order to create the required TCP socket and to subsequently bind the socket to an appropriate client port number.

Within the ME 44 and at 98, the ME receives the aforementioned connection request and effectively creates a new TCP server socket in order to leave the original server socket available for any further incoming connection requests. The ME can be arranged to allocate a new server port number and from this point onwards, the new allocated port number is associated with the first client 40 and all further data from that client will be sent to that particular port.

Subsequently, the ME 44 can respond with a confirmation of receipt and enablement of the connection request by way of signaling 100.

Next, and assuming that the second client 42 likewise wishes to communicate with the UICC 46, similar socket creation 102 and binding 104 signaling is received at the ME 44 from this second client. Thus at 106, the same port number allocation process as conducted at 98 in relation to the first client, is conducted in relation to the second client.

Confirmation of the receipt and enablement of the connection is then returned as signaling 108 from the ME 44 to the second client 42. All subsequent signaling arises in the same context as for the support of UDP illustrated in FIG. 3 and so is not illustrated further. In confirmation, the ME has allocated two different port numbers to the first and second clients 40,42. The ME can then associate the port numbers to two different identifiers and pass this information for use by the UICC so as to allow the UICC to discriminate between data originating from the two different clients, even though they share the same IP address.

Returning to the embodiment supporting UDP, this can be based upon signaling proposed for supporting TCP but with various additions and amendments as illustrated by the following proposals.

For example, the "Terminal Profile" APDU command can be amended to add the support of "UICC in UDP server mode".

Figure 5:
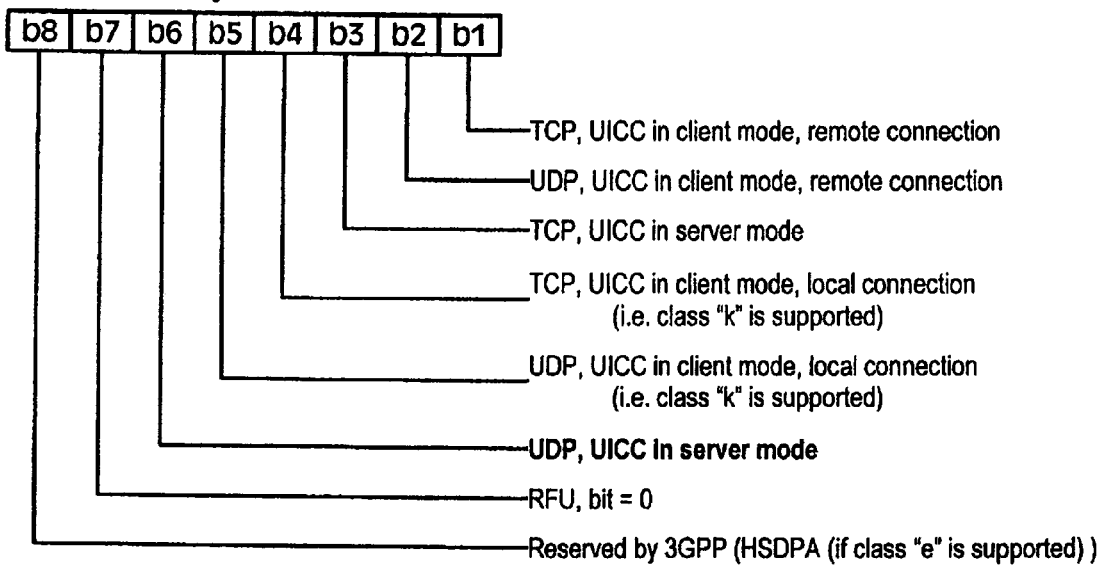
FIG. 5 is an illustration of a revised structure within a terminal profile message so as to allow for support of a chip-card within a UDP server mode.

The nature of such suggested amendment to the APDU command is illustrated in FIG. 5 with reference to the seventeenth byte and which serves to show the addition at "b6" of the support for UDP UICC in server mode.

Also, the "OPEN CHANNEL related to UICC Server Mode" proactive command can be amended in order to add the support of UICC in UDP server mode.

More particularly, the "UICC/terminal interface transport level" data object included in this Open Channel command can be amended in order to add the support of UICC in UDP server mode:

At the UICC/terminal interface transport level, this clause applies if class "e" is supported.

| Byte(s) | Description | Length |
|---------|-------------|--------|
| 1 | UICC/terminal interface transport level tag | 1 |
| 2 | Length = "03" | 1 |
| 3 | Transport protocol type | 1 |
| 4 to 5 | Port number | 2 |

Coding of the Transport protocol type:
'01': UDP, UICC in client mode, remote connection;
'02': TCP, UICC in client mode, remote connection;
'03': TCP, UICC in server mode;
'04': UDP, UICC in client mode, local connection
'05': TCP, UICC in client mode, local connection
'06': UDP, UICC in server mode;
all other values are reserved.
UDP is defined in RFC 768[9]; TCP is defined in RFC 793[10].

Coding of the Port number:
integer.

It should be appreciated that the value '06' is provided as an example as this is based on one particular version of the specification, although of course the value could be changed if required.

With regard to the "Device Identities" data object, this can be amended in order to add an identifier which allows for several UDP clients to be distinguished. Also, a new range of values can be defined. For example, and with an embodiment of the present invention, nine possible values (31 to 39) can be defined. Of course, it should be appreciated that this is not a limitation and further extensions are possible using further values such as 41 to 49, etc.

Referring now to device identities, these can be arranged as follows.

| Byte(s) | Description | Length |
|---------|-------------|--------|
| 1 | Device identities tag | 1 |
| 2 | Length = '02' | 1 |
| 3 | Source device identity | 1 |
| 4 | Destination device identity | 1 |

Source Device Identity:
  Contents:
    the source device for information held in the data objects which follow.
Destination Device Identity:
  Contents:
    the destination device for information held in the data objects which follow.

As usual, it should be noted that only some combinations of Type of Command, Data Download type and Device identities are allowed. These are defined in clause 10.

Coding:
  both Source and Destination device identities are coded as follows:
  '01'=Keypad;
  '02'=Display;
  '03'=Earpiece;
  '10' to '17'=Additional Card Reader x (0 to 7). Value assigned by terminal;
  '21' to '27'=Channel with Channel identifier x (1 to 7). Value assigned by terminal in the Channel status Comprehension TLV of the TERMINAL RESPONSE following an OPEN CHANNEL command;

'31' to '39'=UDP client application identifier (1 to 9) in case UICC in UDP server mode is supported
'81'=UICC;
'82'=terminal;
'83'=network;
All other values are reserved.

Again it is noted that this Device Identities data object can be included in the following commands:
from ME to UICC:
  Envelope "Event Download-Data Available"
  Terminal Response
from UICC to ME:
  Receive Data
  Send Data As will be appreciated, the ME has to associate the UDP client application source port (see below) with a UDP client application identifier above.

Before any communication between the UDP client application 40, 42 in the ME 44 and the UDP server in the UICC 46, the client application 40, 42 is first associated with a port number in order to be able to retrieve any data (answers) from the server 46 and as noted the procedure can be that:
the client first creates a UDP datagram socket and which could be done using any standard socket libraries:
hSocket=socket(AF_INET, SOCK_DGRAM, IPPROTO_UDP);
in accordance with this example of the invention, the client then binds this socket to a particular port number (this will be the client source port number) and this port number can be fixed in advance or dynamically allocated by the ME such as for example:
bind (hSocket, (struct sockaddr *) & address, size of (address))

It should be noted that the client IP address and port number are contained in the "sockaddr" structure and from his point, the ME must associate a UDP client identifier with this client port number. This could be achieved by way of a simple array which could be stored in the ME memory in the following format.

| UDP client Port Number | UDP client identifier |
|---|---|
| 2222 | 31 |
| 2257 | 32 |
| 2378 | 33 |
| 2453 | 34 |

On the ME-UICC interface, the UDP client identifier will be then used in order to distinguish between several UDP clients For example using the values above, when the UDP client application 40, 42 in the ME 44 using port 2222 sends data to the server in the UICC 46, the ME 44 will pass the identifier "31" along with the data to the UICC 46.

When the UICC 46 sends the reply, it will indicate "31" in its answer; The ME 44 will then send this data to the UDP port 2222.

By binding the client applications UDP sockets to some local UDP ports, the ME can simply and clearly identify each of these UDP client applications. Supporting several UDP clients from the ME for a UICC UDP server is then achieved in a simple manner as only a single identifier is required in order to allow the UICC to distinguish between several UDP clients.

Such an exemplary embodiment of the invention also has an exemplary advantage of keeping the existing interface almost unchanged as the new UDP client identifier could be passed within an already existing data object, and would not lead to any backward compatibility issues.

While the invention has been particularly shown and described with reference to exemplary embodiments thereof, the invention is not limited to these exemplary embodiments. It will be understood by those of ordinary skill in the art that various changes in form and details may be made therein without departing from the spirit and scope of the present invention as defined by the claims.

This application is based upon and claims the benefit of priority from UK patent application No. 0821236.7, filed on Nov. 20, 2008, the disclosure of which is incorporated herein in its entirety by reference.

The invention claimed is:

1. A method of communication within a mobile radio communications device between a chip-card comprising a Universal Integrated Circuit Card (UICC) in server mode and any one or more of a plurality of clients each having a same IP address,
said method comprising:
creating for each of said plurality of clients a socket, wherein each socket is bound to a client port;
associating a client identifier to each of bound client ports; and
making each said client identifier available to the chip-card whereby the chip card can distinguish between said plurality of clients,
wherein said method is arranged to support both Universal Datagram Protocol (UDP) communication between a server and said plurality of clients, and Transmission Control Protocol (TCP) communication, said method being arranged to support a creation of TCP sockets, and
wherein the method further comprises:
sending, by the mobile radio communications device, a terminal profile message to the chip-card during a power-up sequence of the mobile radio communications device, the terminal profile message indicating that a UICC UDP server mode is supported by the mobile radio communications device when said plurality of clients comprise UDP clients, and the terminal profile message indicating that the TCP and the UICC in server mode are supported by the mobile radio communications device when said plurality of clients comprise TCP clients; and
sending, by the chip-card, an open channel proactive command signaling to the mobile radio communications device, the open channel proactive command signaling indicating a wish of the chip-card to open a channel in a protocol mode as indicated by the terminal profile message.

2. The method as claimed in claim 1, wherein said plurality of clients are provided within said mobile radio communications device.

3. The method as claimed in claim 1, wherein said client port assigned to be bound to a particular socket is assigned by way of the mobile radio communications device.

4. The method as claimed in claim 1, wherein said client port to be bound to a particular socket is derived from a predetermined selection of ports.

5. The method as claimed in claim 1, further comprising making the client identifier available to a mobile radio communications device-chip-card interface.

6. The method as claimed in claim 1, wherein support of a chip-card and UDP server mode is provided within Application Protocol Data Unit (APDU) command signaling.

7. The method as claimed in claim 1, wherein support of the UICC UDP server mode is provided within the open channel proactive command signaling.

8. The method as claimed in claim 1, wherein a signaling message is sent to said chip-card from one of a plurality of clients, said signaling message including a client identifier associated with a bound socket and client port, such that the chip-card can distinguish between said plurality of clients.

9. The method as claimed in claim 8, wherein said signaling message comprises a terminal response message.

10. The method as claimed in claim 8, wherein said signaling message comprises a data available message.

11. The method as claimed in claim 1, wherein a signaling message is sent from said chip-card to at least one of said plurality of clients, said signaling message including a client identifier associated with a bound socket and client port, such that the chip-card can distinguish between said plurality of clients.

12. A method as claimed in claim 8, herein said signaling message comprises a sending data command signal.

13. The method as claimed in claim 11, wherein said signaling message comprises a receiving data command signal.

14. The method as claimed in claim 1, further comprising:
   monitoring for an incoming connection request on a server port; and
   creating a further TCP server socket responsive to the incoming connection request so as to leave an original server socket for a further incoming connection request.

15. The method as claimed in claim 8, further comprising:
   monitoring for an incoming connection request on a server port; and
   creating a further TCP server socket responsive to the incoming connection request so as to leave an original server socket for a further incoming connection request.

16. The method as claimed in claim 11, further comprising:
   monitoring for an incoming connection request on a server port; and
   creating a further TCP server socket responsive to the incoming connection request so as to leave an original server socket for a further incoming connection request.

\* \* \* \* \*